United States Patent
Abramov et al.

(10) Patent No.: US 7,046,244 B2
(45) Date of Patent: *May 16, 2006

(54) SYSTEM AND METHOD FOR RENDERING IMAGES USING A STRICTLY-DETERMINISTIC METHODOLOGY INCLUDING RECURSIVE ROTATIONS FOR GENERATING SAMPLE POINTS

(75) Inventors: Georgy Abramov, Berlin (DE); Kristjan Valur Jonsson, Hafnarfjördur (IS)

(73) Assignee: Mental Images. GmbH & Co, KG., (DE)

( * ) Notice: Subject to any disclaimer, the term of this patent is extended or adjusted under 35 U.S.C. 154(b) by 70 days.

This patent is subject to a terminal disclaimer.

(21) Appl. No.: 10/165,178

(22) Filed: Jun. 7, 2002

(65) Prior Publication Data
US 2003/0034968 A1    Feb. 20, 2003

Related U.S. Application Data

(60) Provisional application No. 60/297,139, filed on Jun. 7, 2001.

(51) Int. Cl.
*G06T 15/60* (2006.01)
(52) U.S. Cl. ............... 345/426; 345/611; 345/613
(58) Field of Classification Search ........... 349/418, 349/426
See application file for complete search history.

(56) References Cited

U.S. PATENT DOCUMENTS 6,529,193 B1 * 3/2003 Herken et al. .......... 345/426

6,664,961 B1 * 12/2003 Ray et al. .............. 345/424

FOREIGN PATENT DOCUMENTS

| WO | WO 97 50060 | 12/1997 |
|---|---|---|
| WO | WO 98 59332 | 12/1998 |

OTHER PUBLICATIONS

Art B. Owen, "Latin Supercube Sampling for Very High-Dimensional Simulations", ACM Transactions on Modeling and Computer Simulation, vol. 8, No. 1, Jan. 1998, pp. 71-102.*

* cited by examiner

*Primary Examiner*—Ulka Chauhan
*Assistant Examiner*—Enrique L. Santiago
(74) *Attorney, Agent, or Firm*—Gesmer Updegrove LLP

(57) ABSTRACT

A computer graphics system generates a pixel value for a pixel in an image, the pixel being representative of a point in a scene. The computer graphics system generates the pixel value by an evaluation of an integral of a selected function. The computer graphics system comprises a sample point generator and a function evaluator. The a sample point generator is configured to generate respective sets of sample points each associated with one of a series of rays in a ray trace configured to have a plurality of trace levels. The ray at at least one level can be split into a plurality of rays, with each ray being associated with a ray instance identifier. The sample point generator is configured to generate the sample points as predetermined strictly-deterministic low-discrepancy sequence to which a selected rotation operator is applied recursively for the respective levels. The function evaluator is configured to generate a plurality of function values each representing an evaluation of the selected function at one of the sample points generated by the sample point generator and use the function values in generating the pixel value. In one embodiment, the selected rotation operator is the Cranley-Patterson rotation operator.

9 Claims, 2 Drawing Sheets

SYSTEM AND METHOD FOR RENDERING IMAGES USING A STRICTLY-DETERMINISTIC METHODOLOGY INCLUDING RECURSIVE ROTATIONS FOR GENERATING SAMPLE POINTS

INCORPORATION BY REFERENCE

This application claims the benefit of Provisional Application No. 60/297,139, filed Jun. 7, 2001.

U.S. patent application Ser. No. 08/880,418, filed Jun. 23, 1997, in the names of, Martin Grabenstein, et al., entitled "System And Method For Generating Pixel Values For Pixels In An Image Using Strictly Deterministic Methodologies For Generating Sample Points," (hereinafter referred to as the Grabenstein application) assigned to the assignee of this application, incorporated by reference.

U.S. patent application Ser. No. 09/884,861, filed Jun. 19, 2001, in the name of Alexander Keller, entitled "System And Method For Generating Pixel Values For Pixels In An Image Using Strictly Deterministic Methodologies For Generating Sample Points," (hereinafter referred to as the Keller application) assigned to the assignee of this application, incorporated by reference.

FIELD OF THE INVENTION

The invention relates generally to the field of computer graphics, and more particularly to systems and methods for generating pixel values for pixels in an image being rendered using strictly-deterministic low-discrepancy sequences and recursive rotations, such as Cranley-Patterson rotations, to provide sample points for generating estimates of values of integrals representing the pixel values.

BACKGROUND OF THE INVENTION

In computer graphics, a computer is used to generate digital data that represents the projection of surfaces of objects in, for example, a three-dimensional scene, illuminated by one or more light sources, onto a two-dimensional image plane, to simulate the recording of the scene by, for example, a camera. The camera may include a lens for projecting the image of the scene onto the image plane, or it may comprise a pinhole camera in which case no lens is used. The two-dimensional image is in the form of an array of picture elements (which are variable termed "pixels" or "Pels"), and the digital data generated for each pixel represents the color and luminance of the scene as projected onto the image plane at the point of the respective pixel in the image plane. The surfaces of the objects may have any of a number of types of characteristics, including shape, color, specularity, texture, and so forth, which are preferably rendered in the image as closely as possible, to provide a realistic-looking image.

Typically in computer graphics, images are rendered by evaluating integrals to evaluate rays that are traced between a light source and pixels on the image plane, the rays representing paths that would be taken by photons between a respective light source and the pixels on the image plane. The evaluations of the integrals essentially provide information as to the intensity and color of the photon flux that is incident on respective pixels in the image plane. Typically, the integrals have the form $$\int_{I^{s_1}} \cdots \int_{I^{s_n}} f(x^{(1)}, \ldots, x^{(n)}) dx^{(n)} \ldots dx^{(n)} \tag{1}$$

where "$f$" is a function defined on an $s_1 + \ldots + s_n = s$ dimensional unit cube $[0,1)^s$. Depending on the position and orientation of the image plane with respect to the light source(s), some of the rays may represent photon paths directly from a light source to the pixel on the image plane. Similarly, depending on the position and orientation of the image plane relative to objects in the scene, some of the rays may represent photon paths from the light source to a pixel on the image plane after being reflected off one or more of the surfaces of objects in the scene. As noted above, surfaces of the objects may have any of a number of types of characteristics, which, in turn, can affect things like the colors and directions of the photons reflected therefrom. A surface's color can affect the colors of the reflected photons. For example, if the surface is blue, the reflected photons would be primarily if not exclusively photons associated with the color blue. Other characteristics of a surface can affect the directions of the photons reflected therefrom, and thus can affect the path(s) of the ray(s) traced from the respective surface. Since various types of surface characteristics may cause photons to be reflected in a number of directions, a ray that is incident on a surface is typically "split" into a plurality of reflected rays, which may have directions that depend on the characteristics of the respective surface. For example, if a surface is generally specular, the reflected rays will have similar directions, near the angle of incidence. On the other hand, if surface is generally diffuse, the reflected rays will generally have a wide variety of directions, which may differ substantially from the angle of incidence.

Typically, integrals such as that represented by equation (1) do not have closed form solutions, and are generally evaluated numerically. An integral such as that represented by equation (1) can be evaluated numerically as follows:

$$\frac{1}{N_1} \sum_{i_1=0}^{N_1-1} \cdots \frac{1}{N_n} \sum_{i_n=0}^{N_n-1} f(x_{i_1}^{(1)}, \ldots, x_{i_n}^{(n)}), \tag{2}$$

where each $f(x_{i_1}^{(1)}, \ldots, x_{i_n}^{(n)})$ in the sum is an evaluation of the function "$f$" at a sample point $(x_{i_1}^{(n)}, \ldots, x_{i_n}^{(n)})$ in the integration domain. Sample points can be generated using any of a number of methodologies; the Grabenstein application describes a methodology in which sample points comprise samples from s-dimensional strictly-deterministic low-discrepancy sequences such as Halton sequences, and the Keller application describes a methodology in which sample points comprise s-dimensional Hammersley point sets. Generally, ones of the dimensions $s_1, \ldots, s_n$ are associated with respective photon traces between the light source and the image plane.

Problems can arise particularly in situations in which a number of rays have substantially similar directions.

SUMMARY OF THE INVENTION

The invention provides a new and improved system and method for generating pixel values for pixels in an image being rendered using strictly-deterministic low-discrepancy sequences and recursive rotations, such as Cranley-Patterson rotations, to provide sample points for generating estimates of values of integrals representing the pixel values.

In brief summary, the invention provides a computer graphics system for generating a pixel value for a pixel in an image, the pixel being representative of a point in a scene. The computer graphics system generates the pixel value by an evaluation of an integral of a selected function. The computer graphics system comprises a sample point generator and a function evaluator. The a sample point generator is configured to generate respective sets of sample points each associated with one of a series of rays in a ray trace configured to have a plurality of trace levels. The ray at at least one level can be split into a plurality of rays, with each ray being associated with a ray instance identifier. The sample point generator is configured to generate the sample points as predetermined strictly-deterministic low-discrepancy sequence to which a selected rotation operator is applied recursively for the respective levels. The function evaluator is configured to generate a plurality of function values each representing an evaluation of the selected function at one of the sample points generated by the sample point generator and use the function values in generating the pixel value.

In one embodiment, the selected rotation operator is the Cranley-Patterson rotation operator.

In addition, in one embodiment, the sample point generator is configured to cache sample points that it generates for respective trace levels and use the cached sample points during generation of sample points for subsequent trace levels.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
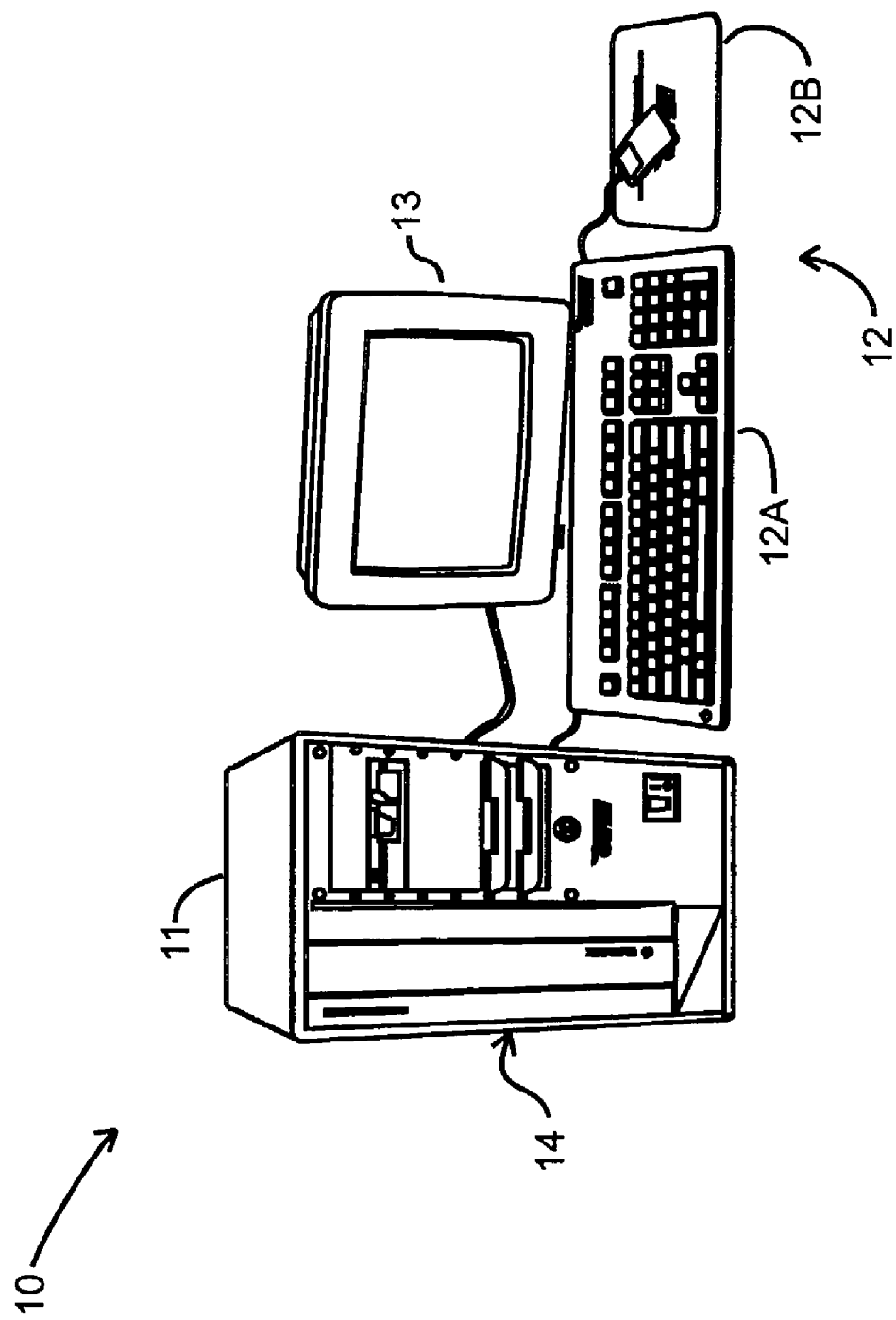
FIG. 1 depicts an illustrative computer graphics system constructed in accordance with the invention.

The invention provides an computer graphic system and method for generating pixel values for pixels in an image of a scene, which makes use of a strictly-deterministic methodology for generating sample points for use in generating sample values for evaluating the integral or integrals whose function(s) represent the contributions of the light reflected from the various points in the scene to the respective pixel value, to which a selected rotation operator is applied. FIG. 1 attached hereto depicts an illustrative computer system 10 that makes use of such a strictly deterministic methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. If the processor module 11 includes a plurality of processor devices, the respective processor devices may be configured to process various portions of a single task in parallel, in which case the task may be executed more quickly than otherwise. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the,network by means of messages transferred over the communication links, with each message including information and an identifier identifying the device to receive the message.

Figure 2:
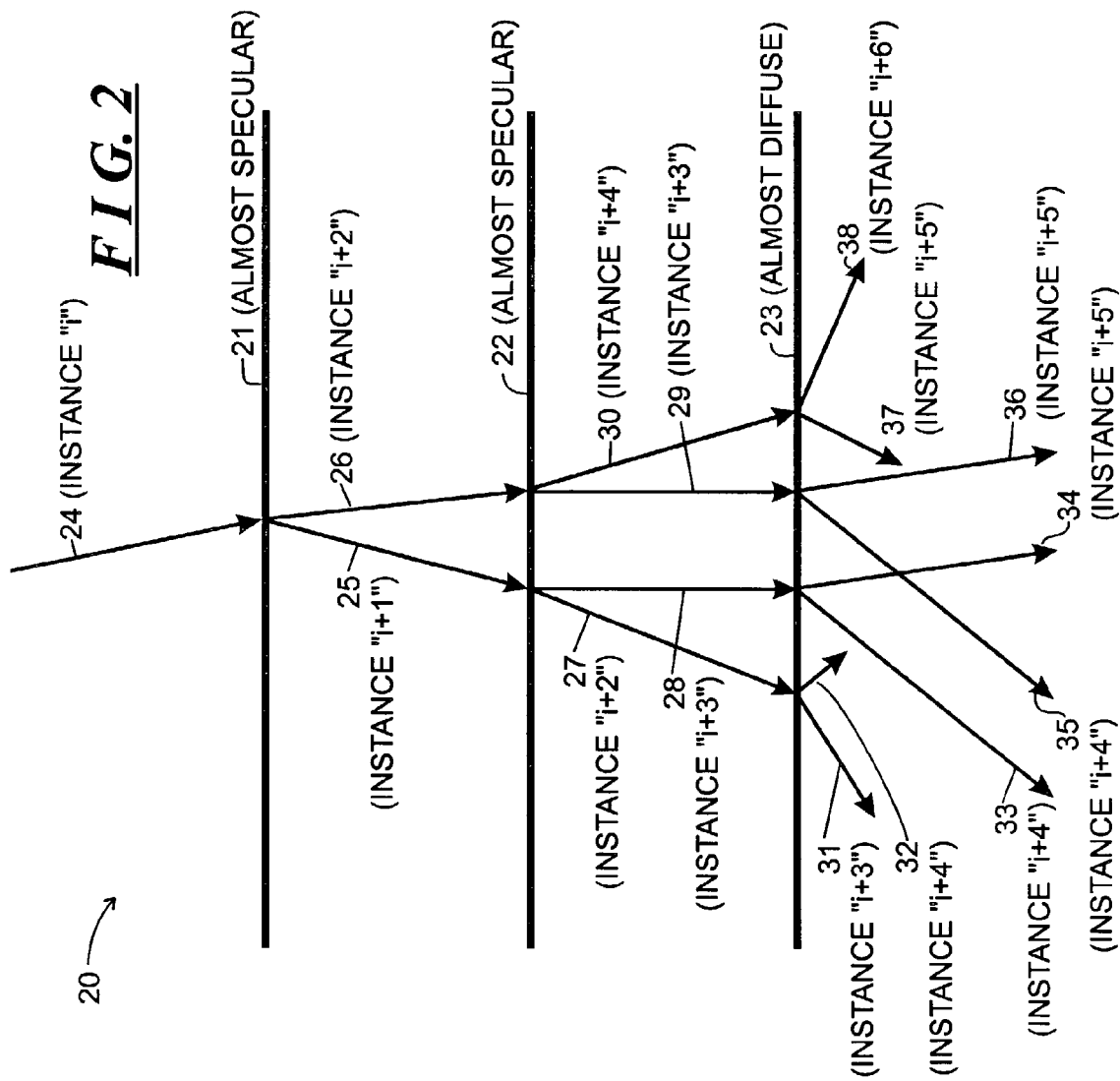
FIG. 2 depicts an illustrative ray trace useful in understanding the invention.

A problem addressed by the invention will be described in connection with FIG. 2. Typically in computer graphics, images are rendered by evaluating integrals to determine characteristics of rays that are traced between a light source and pixels on the image plane. The rays represent paths that taken by simulated photons between respective light source(s) and the pixels on the image plane. FIG. 2 depicts an illustrative ray path 20 that includes reflections off two surfaces 21 and 22 that are primarily glossy but almost specular, followed by a reflection off one surface 23 that is primarily glossy but almost diffuse. The reflections are actually represented in FIG. 2 by refractions to simplify the discussion. The ray 24, which represents photon flux that is incident on the first surface 21, upon reflection is split into a selected number of rays having directions that depend on the characteristics of the surface 21. In the illustration depicted in FIG. 2, the ray 24 incident on surface 21 is split into two rays 25 and 26, but it will be appreciated that the computer graphics system 10 may be controlled to split the incident ray into any number of rays upon reflection from the surface. In the illustration depicted in FIG. 2, both rays 25 and 26 are directed to surface 22, but with slightly different angles of incidence since the surface 21 is almost specular.

As with the ray 24 incident on surface 21, the rays 25 and 26 that are directed to surface 22 will be split into a selected number of rays that have directions that depend on their angles of incidence as well as the characteristics of surface 22; in the illustration depicted in FIG. 2, the ray 25 is split into two rays 27 and 28, and the ray 26 is split into rays 29 and 30. Since the surface 22 is almost specular, rays 27 and 28 have almost the same angle of reflection, as do rays 29 and 30. In the illustration depicted in FIG. 2, rays 28 and 29 also have almost the same angles of reflection off surface 22, while the angles of reflection of rays 27 and 30 differ somewhat more substantially.

Rays 27 through 30 are all incident on surface 24. As with surfaces 21 and 22, the angles of reflection of rays reflected from surface 24 will depend on the angles of incidence as well as the surface characteristics of surface 24. Since the surface 24 is almost diffuse, the angles of reflection of the rays 31 through 38 that are reflected from the surface 24 will differ more substantially than with the almost specular surfaces 21 and 22. However, for rays, such as rays 28 and 29, that have almost the same angle of incidence, pairs of associated reflected rays will have substantially the same angles of reflection. This is illustrated by ray pair 33 and 35 and ray pair 34 and 36.

The collection of rays comprise a ray tree, with ray 24 being a root for the tree in the illustration depicted in FIG. 2. Each ray in the ray tree is identified by an instance number, with ray 24 incident on surface 21 being identified by instance number "i" and subsequent rays being based on that instance number. Accordingly, rays 25 and 26, into which ray 24 is split on reflection from surface 21, will have instance numbers "i+1" and "i+2." Similarly, rays 27 and 28, into which ray 25 is split on reflection from surface 22, will have instance numbers "i+2" and "i+3," and rays 29 and 30, into which ray 26 is split on reflection from surface 22, will have instance numbers "i+3" and "i+4." As further shown in the illustration depicted in FIG. 2, each of rays 27 through 30, in turn, will be split into a selected number of rays 31 through 38 when they are reflected from the almost diffuse surface 24, each ray having an instance number that is based on the instance number of the incident ray.

As is apparent, there is an overlap in instance numbers for the various rays, with the degree of overlap depending on the number of rays into which each ray is split when it interacts with a respective surface. An investigation of FIG. 2 reveals that there are three rays, namely, rays 28, 29 and 31, with the same instance number "i+3," two of which, namely rays 28 and 29, are reflected from surface 22 and incident on surface 23 and which have similar spatial characteristics. In addition, there are four rays, namely, rays 30, 32, 33 and 35, with the same instance number "i+4," two of which, namely, rays 33 and 35, are reflected from surface 23 and have similar spatial characteristics. Generally, since the surfaces 21 and 22 are almost specular, the rays 27 through 30 will be in almost the same directions and have very similar spatial characteristics. Accordingly, although the rays reflected off the almost diffuse surface 23 will have a number of directions, since many of the rays incident on surface 23 are from similar angles, many of the rays reflected from surface 24 will also have similar directions and other spatial characteristics. It will be appreciated that the extent of overlap in instance numbers will depend on the number of rays into which each incident ray is split upon interaction with a surface, and the degree to which reflected rays have similar spatial characteristics will depend on the characteristics of the surface from which they are reflected.

Generally, an image is rendered by evaluating integrals to evaluate the rays that are traced between a light source and pixels on the image plane, the rays representing paths that would be taken by photons between a respective light source and the pixel on the image plane. The evaluations of the integrals essentially provide information as to the intensity and color of the photon flux that is incident on respective pixels in the image plane. Typically, the integrals have the form $$\int_{I^{s_1}} \cdots \int_{I^{s_n}} f(x^{(1)}, \ldots, x^{(n)}) dx^{(n)} \ldots dx^{(n)} \tag{3}$$

As noted above, integrals such as that represented by equation (3) (which is the same as equation (1)) typically do not have closed form solutions, and so they are generally evaluated numerically. An integral such as that represented by equation (3) can be evaluated numerically as follows:

$$\frac{1}{N_1} \sum_{i_1=0}^{N_1-1} \cdots \frac{1}{N_n} \sum_{i_n=0}^{N_n-1} f(x_{i_1}^{(1)}, \ldots, x_{i_n}^{(n)}), \tag{4}$$

where each term $f(x_{i_1}^{(1)}, \ldots, x_{i_n}^{(n)})$ in the sum is an evaluation of the function "f" at a sample point $(x_{i_1}^{(n)}, \ldots, x_{i_n}^{(n)})$ in the integration domain. Sample points can be generated using any of a number of methodologies; the Grabenstein application describes a methodology in which sample points comprise samples from s-dimensional strictly-deterministic low-discrepancy sequences such as Halton sequences, and the Keller application describes a methodology in which sample points comprise s-dimensional Hammersley point sets. Generally, ones of the dimensions $s_1, \ldots s_n$ are associated with respective photon traces between the light source and the image plane.

Problems can arise particularly in situations in which a number of rays have substantially similar directions, such as rays 28 and 29 reflected off surface 22 and incident on surface 23, and rays 33 and 35 reflected off surface 23, since it is likely that the same sample points will be used in evaluating the integrals and so at least the portion of the integrals relating to those rays will have substantially the same numerical evaluations. To accommodate that, instead of using equation (2) to numerically evaluate the integral in equation (1), the integral can be evaluated as $$\frac{1}{N_1} \sum_{i_1=0}^{N_1-1} \cdots \frac{1}{N_n} \sum_{i_n=0}^{N_n-1} f(x_{i_1}^{(1)}, S_{i_1}^{(1)} x_{i_2}^{(2)}, S_{i_1}^{(1)} S_{i_2}^{(2)} x_{i_3}^{(3)}, \ldots, S_{i_1}^{(1)} S_{i_2}^{(2)} \ldots S_{i_{n-1}}^{(n-1)} x_{i_n}^{(n)}),$$ (5)

where $S_{i_j}^{(j)}$ are Cranley-Patterson rotation operators, that is, shifts modulo "one" using the correspondingly-higher dimensions up to $s_1 + \ldots + s_n$-dimensional sample points $X_{i_j}^{(j)}$, where the first $s_j$ coordinates of each sample point $X_{i_j}^{(j)}$ correspond to $x_{i_j}^{(j)}$ in equation (3). The coordinates of the sample points $X_{i_j}^{(j)}$ may be taken from a Halton, scrambled Halton, or any other low-discrepancy sequence. For different values of index "j," the same or different low-discrepancy sequence may be used. For example, if the values of some of the splitting indices are known in advance, sets of scrambled or unscrambled Hammersley points may be used. To avoid repeated shifts using the same dimension of the same low-discrepancy sequence, the value of $s_j$ is preferably greater than zero for $j=1, \ldots, n$. As an example, if scrambled Halton sequences are used, the sample points for dimension d, with $s_1 + \ldots + s_l < d \leq s_1 + \ldots + s_{l+1}$ will be given by $$\Phi_{b_d}(i_1, \sigma_{b_d}) \oplus \Phi_{b_{d-1}}(i_2, \sigma_{b_{d-1}}) \oplus \ldots \oplus \Phi_{b_{d-s1-s2-\ldots-sl}}(i_1, \sigma_{b_{d-s1-s2-\ldots-sl}})$$ (6)

where each $\Phi_b(i, \sigma_b)$ is a scrambled radical inverse is defined as $$\Phi_b : N_0 \times S_b \to I$$ (7)

$$(i, \sigma) \mapsto \sum_{j=0}^{\infty} \sigma(a_j(i)) b^{-j-1} \Leftrightarrow i = \sum_{j=0}^{\infty} a_j(i) b^j.$$

for bases $b = b_1, \ldots$, and permutations $\sigma = \sigma_1, \ldots$ for the respective bases. The Keller application describes one illustrative permutation $\sigma$ that is defined recursively as follows. Starting from the permutation $\sigma_2 = (0,1)$ for base $b=2$, the sequence of permutations is defined as follows:

(i) if the base "b" is even, the permutation $\sigma_b$ is generated by first taking the values of $2\sigma_{b/2}$ and appending the values of $$2\sigma_{\frac{b}{2}} + 1,$$

and (ii) if the base "b" is odd, the permutation $\sigma_b$ is generated by taking the values of $\sigma_{b-1}$, incrementing each value that is greater than or equal to $$\frac{b-1}{2}$$

by one, and inserting the value b−1 in the middle.

This recursive procedure results in the following permutations $\sigma_2 = (0,1)$
$\sigma_3 = (0,1,2)$
$\sigma_4 = (0,2,1,3)$
$\sigma_5 = (0,3,2,1,4)$
$\sigma_6 = (0,2,4,1,3,5)$
$\sigma_7 = (0,2,5,3,1,4,6)$
$\sigma_8 = (0,4,2,6,1,5,3,7) \ldots$ Accordingly, given the radical inverse for a value "i" in base "b," if the "k-th" digit of the representation for the radical inverse has the value "j," the "k-th" digit of the scrambled radical inverse has the value corresponding to the value of the "j-th" digit in the permutation $\sigma_b$ above.

Typically, the recursion level in ray tracing does not exceed the trace depth, which generally relates to the number of rays comprising a path between a light source and the image plane. Scrambled and unscrambled Halton sequences and Hammersley point sets can be generated very quickly, since they are based on the radical inverse function, which itself is very fast. Even with a fairly deep trace depth, the cost of generating coordinates for sample points is typically lower than the cost of generating the numerical values for the function "f" for the respective sample points, which, in addition to numerical evaluation, can also include tests for intersection, look-ups for density or texture, and so forth.

In accordance with the invention, a methodology is described below that exploits caching of coordinates of sample points and illustrates how cached sampling can be used in distributed ray tracing, in which ray tracing is distributed across a plurality of processors provided by processor module 11 (FIG. 1). The advantages of caching becomes more evident if more time-consuming methodologies are used to generate low-discrepancy sequences instead of the Halton sequence. The new methodology will be described in connection with Code Segment 1:

| | Code Segment 1 | |
|---|---|---|
| (1) | class QMCContext { | |
| (2) | int i; | //instance number for low-discrepancy vector |
| (3) | int d; | //current integral dimension after the last replication |
| (4) | Cache cache; | //cached information on already computed sample values |
| (5) | QMCContext *parent; | //pointer to parent that generated this QMCContext, if any |
| (6) | int dimension_shift; | //difference in integration dimension between this QMCContext and parent, if any |
| (7) | public: | |
| (8) | double get_sample (int dim, int instance) { | //get already used sample value |
| (9) | double sample = 0; | |
| (10) | if (parent) { | //if there is a parent to this QMCContext //assign cached value from the parent-part of the sum if this QMCContext is not the root (that is, if there is a parent); the Code Segment makes use of cache of the parent here |

-continued

Code Segment 1

```
(11)            if (parent->cache.get(dimension_shift + dim + d) {
(12)                sample = parent->cache.get(dimension_shift + dim + d);
(13)            } else {          //if there is no parent to this QMCContext
(14)                sample = (*parent).get_sample(dimension_shift + dim + d,
                                                  parent->i);
(15)                parent->cache.add(sample, dimension_shift + dim + d);
                }
            }
(16)            sample += $\Phi_{b_{dim+d}}$ (instance,$\sigma_{dim+d}$);
(17)            return sample
        }
        //Initialize context for next (child) context level
(18)        void setup_child_context(QMCContext &context, int dim, int number) {
(19)            context.parent = &this;
(20)            context.d = 1;
(21)            context.i = number + 1      //to avoid the instance number "0" for Halton
                                              sequence
(22)            empty context.cache
(23)            context.dimension_shift = dim
        }
    }
(24) class Ray
    {
(25)        QMCContext context;
(26)        .....
    }
(27) void Shade(Ray& ray)
    {
(28)        Ray next_ray;
(29)        QMCContext &parent = ray.QMCContext;
(30)        .....
(31)        for (int j=0; condition(j); j++) {
            // ray set-up for recursion
(32)            y = ( parent.get_sample(0,j),
                     parent.get_sample(1,j),
                     ....
                     parent.get_sample(dim-i,j)
                   );
(33)            next_ray = SetupRay(y)
            //prepare QMCContext for recursion
(34)            ray.setup_child_context(next_ray.context, dim, j);
        }
(35)        parent.d = += dim;      //do not change until child context is dead
(36)        ....
        //if needed, some similar loops or sample generators
    }
```

Code Segment 1 comprises two classes, namely QMCContext and Ray. One class, class QMCContext, comprising lines (1) through (13), provides two methods, namely, a get-sample method and a setup_child_context method. The get_sample method, comprising lines (8) through (17), provides the sample points that are used in equation (5). Each context level is essentially associated with a level in the ray tree (reference FIG. 2). The get_sample method operates recursively. Initially, in line (10) it determines whether the recursion level is the root level, which will be the case if there is no parent. If there is a parent level, the get_sample method checks a cache that is maintained for the parent level in the recursion to determine whether it contains a sample point (line 11). If the cache does contain a sample point, it uses that sample point, updates the sample point for the current recursion level in line (16), and provides the updated sample point to a method in the class Ray as will be described below. On the other hand, if the cache does not contain a sample point, the get_sample method generates the sample point from the parent's parent level in line (14), and adds the sample point to the parent's cache in line (15). Thereafter, in line (16) the get_sample method updates the sample point that it generated in line (14) for the current recursion level in line (16) and provides the updated sample point to the method in class Ray. Finally, if, in line (10), it is determined that there is no parent, which will be the case if the recursion level is the root level, the get_sample method generates the sample point in line (16) and provides the sample point to the method in class Ray.

The setup_child_context method, comprising lines (18) through (23) of the class QMCContext, initializes the methods provided by class QMCContext for the next lower level, if any.

Class Ray, comprising lines (24) through (36) initializes methods provided by class QMCContext and in addition includes a method Shade. Method Shade, comprising lines (27) through (36), which is used to evaluate equation (5) for a particular ray, calls both methods in the class QMCContext. The method Shade, in line (32), calls the get_sample method in class QMCContext to provide sample points, which are used in line (33) to generate a sample for use in connection with equation (5). In line (34), the method Shade calls the setup_child_context method in class QMCContext to prepare class QMCContext for the next context level, if any.

The invention provides a new and improved computer graphics system that generates pixel values for pixels in an image being rendered using strictly-deterministic low-discrepancy sequences and recursive rotations, such as Cranley-Patterson rotations, to provide sample points for numerically evaluating integrals that represent the pixel values.

Although the invention has been described in connection with recursive Cranley-Patterson rotations, it will be appreciated that other types of rotations may be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer graphics system for generating a pixel value for a pixel in an image, the pixel being representative of a point in a scene, the computer graphics system generating the pixel value by an evaluation of an integral of a selected function, the computer graphics system comprising:

A. a sample point generator configured to generate respective sets of sample points each associated with one of a series of rays in a ray trace configured to have a plurality of trace levels, the ray at at least one level being split into a plurality of rays, each ray being associated with a ray instance identifier, the sample point generator being configured to generate the sample points as a predetermined strictly-deterministic low-discrepancy sequence to which a selected rotation operator is applied recursively for the respective levels;

$$\frac{1}{N}\sum_{i_1=0}^{N_1-1} \cdots \frac{1}{N_n}\sum_{i_n=0}^{N_n-1} f(x_{i_1}^{(1)}, S_{i_1}^{(1)} x_{i_2}^{(2)}, S_{i_1}^{(1)} S_{i_2}^{(2)} x_{i_3}^{(3)}, \cdots, S_{i_1}^{(1)} S_{i_2}^{(2)} \cdots S_{i_{n-1}}^{(n-1)} x_{i_n}^{(n)})$$

and

B. a function evaluator configured to generate a plurality of function values each representing an evaluation of said selected function at one of the sample points generated by said sample point generator and use the function values in generating the pixel value.

2. A computer graphics system as defined in claim 1 in which the selected rotation operator is the Cranley-Patterson rotation operator.

3. A computer graphics system as defined in claim 1 in which the sample point generator is configured to cache sample points that it generates for respective trace levels and use the cached sample points during generation of sample points for subsequent trace levels.

4. A computer graphics method for generating a pixel value for a pixel in an image, the pixel being representative of a point in a scene, the computer graphics system generating the pixel value by an evaluation of an integral of a selected function, the computer graphics method comprising:

A. a sample point generator step of generating respective sets of sample points each associated with one of a series of rays in a ray trace configured to have a plurality of trace levels, the ray at at least one level being split into a plurality of rays, each ray being associated with a ray instance identifier, the sample point generator step includes the step of generating the sample points as a predetermined strictly-deterministic low-discrepancy sequence to which a selected rotation operator is applied recursively for the respective levels;

$$\frac{1}{N}\sum_{i_1=0}^{N_1-1} \cdots \frac{1}{N_n}\sum_{i_n=0}^{N_n-1} f(x_{i_1}^{(1)}, S_{i_1}^{(1)} x_{i_2}^{(2)}, S_{i_1}^{(1)} S_{i_2}^{(2)} x_{i_3}^{(3)}, \cdots, S_{i_1}^{(1)} S_{i_2}^{(2)} \cdots S_{i_{n-1}}^{(n-1)} x_{i_n}^{(n)})$$

and

B. a function evaluator step of generating a plurality of function values each representing an evaluation of said selected function at one of the sample points generated during said sample point generator step, and using the function values in generating the pixel value.

5. A computer graphics method as defined in claim 4 in which the selected rotation operator is the Cranley-Patterson rotation operator.

6. A computer graphics method as defined in claim 4 in which the sample point generator step includes the step of caching sample points that it generates for respective trace levels and using the cached sample points during generation of sample points for subsequent trace levels.

7. A computer program product for use in connection with a computer to provide a computer graphics system for generating a pixel value for a pixel in an image, the pixel being representative of a point in a scene, the computer graphics system generating the pixel value by an evaluation of an integral of a selected function, the computer program product comprising a computer-readable medium having encoded thereon:

A. a sample point generator module configured to enable the computer to generate respective sets of sample points each associated with one of a series of rays in a ray trace configured to have a plurality of trace levels, the ray at at least one level being split into a plurality of rays, each ray being associated with a ray instance identifier, the sample point generator being configured to generate the sample points as a predetermined strictly-deterministic low-discrepancy sequence to which a selected rotation operator is applied recursively for the respective levels;

$$\frac{1}{N}\sum_{i_1=0}^{N_1-1} \cdots \frac{1}{N_n}\sum_{i_n=0}^{N_n-1} f(x_{i_1}^{(1)}, S_{i_1}^{(1)} x_{i_2}^{(2)}, S_{i_1}^{(1)} S_{i_2}^{(2)} x_{i_3}^{(3)}, \cdots, S_{i_1}^{(1)} S_{i_2}^{(2)} \cdots S_{i_{n-1}}^{(n-1)} x_{i_n}^{(n)})$$

and

B. a function evaluator module configured to enable the computer to generate a plurality of function values each representing an evaluation of said selected function at one of the sample points generated by said sample point generator and use the function values in generating the pixel value.

8. A computer program product as defined in claim 7 in which the selected rotation operator is the Cranley-Patterson rotation operator.

9. A computer program product as defined in claim 1 in which the sample point generator module is configured to enable the computer to cache sample points that it the computer generates for respective trace levels and to use the cached sample points during generation of sample points for subsequent trace levels.

* * * * *